US009615501B2

(12) United States Patent
Pickett et al.

(10) Patent No.: US 9,615,501 B2
(45) Date of Patent: Apr. 11, 2017

(54) CONTROLLING THE POSITION OF AN AGRICULTURAL IMPLEMENT COUPLED TO AN AGRICULTURAL VEHICLE BASED UPON THREE-DIMENSIONAL TOPOGRAPHY DATA

(75) Inventors: Terence Daniel Pickett, Waukee, IA (US); Shufeng Han, Johnston, IA (US)

(73) Assignee: DEERE & COMPANY, Moline, IL (US)

( * ) Notice: Subject to any disclaimer, the term of this patent is extended or adjusted under 35 U.S.C. 154(b) by 2260 days.

(21) Appl. No.: 11/655,492

(22) Filed: Jan. 18, 2007

(65) Prior Publication Data

US 2008/0177449 A1    Jul. 24, 2008

(51) Int. Cl.
*G06F 7/70* (2006.01)
*G06F 19/00* (2011.01)
*G06G 7/00* (2006.01)
*G06G 7/76* (2006.01)
*A01B 69/00* (2006.01)
*A01D 41/14* (2006.01)

(52) U.S. Cl.
CPC .......... *A01B 69/004* (2013.01); *A01D 41/141* (2013.01)

(58) Field of Classification Search
USPC .......... 701/213, 400, 50, 408, 409; 340/988, 340/995, 689; 342/107, 357, 22, 118; 56/10.2 E, 208; 172/4.5, 799
See application file for complete search history.

(56) References Cited

U.S. PATENT DOCUMENTS 4,776,153 A    10/1988  DePauw et al.
4,945,221 A  *  7/1990  Nielsen et al. ............ 250/203.1
5,666,793 A     9/1997  Bottinger
(Continued)

FOREIGN PATENT DOCUMENTS

DE    19544112       5/1997
JP    2-21959 A      1/1990
WO    WO 95/16228    6/1995

OTHER PUBLICATIONS

Nistala, G.J., "Development of an Inexpensive Guidance System for Agricultural Purposes," Thesis, Louisiana State University, May 2006, <URL: http://etd.lsu.edu/docs/available/etd-01122006-153035/unrestricted/Nistala_thesis.pdf>.
(Continued)

*Primary Examiner* — Ronnie Mancho
(74) *Attorney, Agent, or Firm* — Yee & Associates, P.C.

(57) ABSTRACT

A system for controlling the position of an agricultural implement coupled to an agricultural vehicle comprises a control unit connected to a field topography database containing three-dimensional data of the topography of a field, a location signal generation arrangement providing location data of the position of the vehicle and/or the implement in the field, an implement position sensor arranged to sense the position of the implement with respect to the ground and to a positioning arrangement configured to move the implement in response to position control signals from the control unit. The control unit is operable to provide the control signals based upon a combination of actual position data received from the implement position sensor and expected required position change data that are derived from elevation data recalled from the field topography database based upon the location data.

14 Claims, 4 Drawing Sheets

(56) References Cited

U.S. PATENT DOCUMENTS

| | | | |
|---|---|---|---|
| 5,955,973 A * | 9/1999 | Anderson | 340/988 |
| 5,961,573 A | 10/1999 | Hale et al. | |
| 6,041,582 A * | 3/2000 | Tiede et al. | 56/10.2 A |
| 6,073,070 A | 6/2000 | Diekhans | |
| 6,085,135 A | 7/2000 | Steckel | |
| 6,112,145 A * | 8/2000 | Zachman | 701/50 |
| 6,236,924 B1 | 5/2001 | Motz et al. | |
| 6,286,606 B1 * | 9/2001 | Krieg et al. | 172/4.5 |
| 6,295,746 B1 * | 10/2001 | Meduna et al. | 37/382 |
| 6,345,231 B2 | 2/2002 | Quincke | |
| 6,389,345 B2 * | 5/2002 | Phelps | 701/50 |
| 6,615,570 B2 | 9/2003 | Beck et al. | |
| 6,791,488 B2 * | 9/2004 | Diekhans et al. | 342/22 |
| 6,813,873 B2 | 11/2004 | Allworden et al. | |
| 7,588,088 B2 * | 9/2009 | Zachman | 172/4.5 |
| 7,970,519 B2 * | 6/2011 | Green | 701/50 |
| 2003/0000193 A1 | 1/2003 | Beck et al. | |
| 2007/0021913 A1 * | 1/2007 | Heiniger et al. | 701/213 |

OTHER PUBLICATIONS

European Search Report dated Sep. 16, 2011, (5 pages).

* cited by examiner

CONTROLLING THE POSITION OF AN AGRICULTURAL IMPLEMENT COUPLED TO AN AGRICULTURAL VEHICLE BASED UPON THREE-DIMENSIONAL TOPOGRAPHY DATA

FIELD OF THE INVENTION

The present invention relates to a system for controlling the position of an agricultural implement coupled to an agricultural vehicle.

BACKGROUND OF THE INVENTION

A number of agricultural implements need to be moved during work in a position relatively close to the ground of a field. However, in order to avoid damage, a contact between the implement and the ground needs to be avoided.

A typical example is a header for a self-propelled harvesting machine like a combine harvester or a forage harvester. Such headers include grain cutting platforms, corn pickers and corn cutting machines. In the prior art, mechanical ground height sensors have been used for an automatic header height control. These ground height sensors are pivotally mounted below the frame of the header such that they pivot around an axis extending horizontally and transversely to the forward direction and have a surface in mechanical contact with the ground. A potentiometer is coupled to the sensor and submits ground height information to a ground height controller. The latter controls an actuator for adjusting the height of the header with respect to the self propelled harvesting machine such that the height of the header above the ground corresponds to a predefined value, which is usually input by an operator. Often, at least two ground height sensors are distributed over the width of the header, in order to automatically maintain a lateral orientation of the header parallel to the ground. The ground height controller then also controls an actuator moving the header with respect to the self propelled harvesting machine around a horizontal axis extending in the forward direction. It has also been proposed to have contact-less sensors on the header that measure the distance to the ground with electromagnetic or ultrasonic waves.

One disadvantage of these sensors mounted to the header and interacting with the ground below the header, even if they are mounted at the forward end of the header, as on a divider tip (see, for example, U.S. Pat. No. 6,813,873), is that they are not able to cause a sufficiently fast lifting of the header when the header is approaching sharp rises in the ground topography. Due to the position of the sensor and the reaction time of the actuator, collisions with the ground cannot always be avoided, causing severe and expensive damage to the header. Additionally, debris such as rocks can be collected and damage parts of the header and of the harvesting machine. This problem is greater with the relatively high ground speeds of actual harvesting machines, since the required reaction time is shorter.

U.S. Pat. No. 6,615,570 discloses mounting an optical sensor to a self-propelled harvesting machine. The sensor submits electromagnetic waves towards the ground or a crop area in a distance ahead of the header and determines the flight time of the reflected waves. The elevation of the ground ahead of the harvesting machine is thus determined and used for automatically controlling the position of the header prior to the header reaching the crop area. This improves the response of the header and reduces incidences of improper header position resulting from rapidly changing contours, but requires a relatively expensive optical sensor.

U.S. Pat. No. 5,666,793 proposes driving over a field with a harvesting machine and recording the yield and the header height dependent on the position of the harvesting machine. The header height is manually selected by the operator during recording. When the harvesting machine travels over an adjacent path or (in the next harvest season) over the same path, the geo-referenced recorded header heights are used as position dependent nominal values for an automatic header height control. In this manner, the header height can be adjusted to reflect changes in the ground. Since the header height depends on manual input of the operator, at least during the first path, it is required that the latter carefully supervises the header height above the ground, especially when ground contours are rapidly changing. Further, using the header height from a previous path adjacent the actual path involves the risk of ground collisions when ground contours in the adjacent paths are significantly different.

U.S. Pat. No. 5,961,573 proposes to record the position of obstructions on a field, like rocks, by visual detection during a scouting operation or while the field is being worked or by storing information after a rock is hit by an implement such as a plow. The header of the harvesting machine is subsequently automatically lifted based upon the geo-referenced obstruction position data to avoid incidences in sufficient time before the obstruction is hit. Due to the fact that the obstruction position data is to be collected manually, this procedure is feasible only for fields with a small number of obstructions, but not for fields with rapidly changing ground contours.

U.S. Pat. No. 6,073,070 proposes to determine a terrain model of a field using sensors mounted to a header of a combine measuring the height of the header over the ground. This terrain model is subsequently used for a new treatment of the field with an available agricultural vehicle. It is not described in which manner the terrain model is used for controlling the implement position during the new treatment.

Another example of an agricultural implement with variable height adjustment is a sprayer boom. Generally, the boom is maintained by suitable actuators in a predetermined height above the ground, controlled manually or automatically based upon e.g., roughness of the ground, which is measured by detecting movement of a spring suspended front wheel frame of a tractor ( see, for example, Japanese patent JP 02 021 959 A). This detection suffers also from the disadvantage that uneven ground is detected too late to avoid ground contacts of the boom.

Thus, there is a need for a simple and reliable system for controlling the position of an agricultural implement coupled to an agricultural vehicle to control the position of the implement in a manner to avoid ground incidences at rapidly changing ground contours, independently from an operator.

It is an object of the present invention to provide a simple, reliable, and responsive system for controlling the position of an agricultural implement coupled to an agricultural vehicle.

SUMMARY OF THE INVENTION

A system for controlling the position of an agricultural implement coupled to an agricultural vehicle comprises a control unit connected to a field topography database containing three-dimensional data of the topography of a field, a location signal generation arrangement providing location data of the position of the vehicle and/or the implement in the field, an implement position sensor sensing the position of the implement with respect to the ground, and an electro-hydraulic valve structure that controls one or more hydraulic systems (e.q., header tilt system or lift system) configured to move the implement (e.q., header) in response to position control signals from the control unit. The control unit uses a combination of actual position data received from the implement position sensor and expected or predictive required position change data that are derived from elevation data of the field topography database to determine the position control signals.

The implement position is thus automatically controlled based upon the actually measured position over the ground and a predictive value is taken from the pre-recorded three-dimensional topography of the field in a manner such that a pre-determined or desired vertical distance between the surface of the ground and the implement is continuously maintained. When the ground in front of the implement has a steep incline, the implement can accordingly be raised before the implement hits the incline. Analogously, the implement can be lowered when the ground ahead of the implement comprises a steep decline.

Since the actual position of the implement is also considered by incorporating the data from the implement position sensor, possible absolute errors in the elevation data do not influence the implement position. Further, if the profile of the field has changed since the data in the topography database has been collected, this is recognized by the implement position sensor, such that unintended position errors of the implement (and damage thereto) can be avoided. Another possible source of error, moist ground or other environmental influences leading to wheels of the vehicle penetrating the ground further than expected, is thus avoided.

It is an advantage of the present invention that the position control signals for the implement are provided in a simple and reliable manner, since a location signal generation arrangement like a Global Positioning System (GPS) reception antenna is provided on many agricultural vehicles, and the three-dimensional topographic database does not involve significant additional expense. The operator can operate the implement close to the ground at a relatively high speed without a risk of ground incidents even when a rapid slope change is encountered.

The expected or predictive required position change data can be recalled from the field topography database based upon heading data that contains information about the forward direction (seen in a horizontal plane, e.g. an angle measured with respect to the south-north direction) and preferably about the speed of the vehicle. This heading data can be obtained by subtracting two subsequent positions from the location signal generation arrangement and/or using data differences from two spaced location signal generation arrangements mounted to the vehicle and/or using a signal from a compass and/or using a signal from an inertial navigation system and/or by using a signal from a steering system of the vehicle.

The control unit can alter the height of the implement with respect to the vehicle based upon the difference between the elevation of the ground below the implement and the elevation of the ground in a forward direction ahead of the implement.

Further, the lateral inclination of the implement can be altered by the control unit based upon the difference between the lateral inclination of the ground below the implement and the lateral inclination of the ground in a forward direction ahead of the implement.

Preferably, the position control signals are provided to the position altering arrangement sufficiently early before the implement reaches the predefined area ahead of the vehicle, such that the desired position of the implement is achieved when the predefined area is reached.

The invention can be used on any type of agricultural vehicles and corresponding implements. Examples are harvesting machines like combines, forage harvesters and cotton harvesters with corresponding headers, tractors with ground working, seeding or tillage implements and tractors with spraying booms or self propelled spraying vehicles with spraying booms. All these implements can be moved with the proposed system in a predetermined height above (or below, like the ground working, seeding or tillage implements) the ground.

These and other objects, features and advantages of the present invention will become apparent to one skilled in the art upon reading the following detailed description in view of the drawings.

DESCRIPTION OF THE PREFERRED EMBODIMENT

Figure 1:
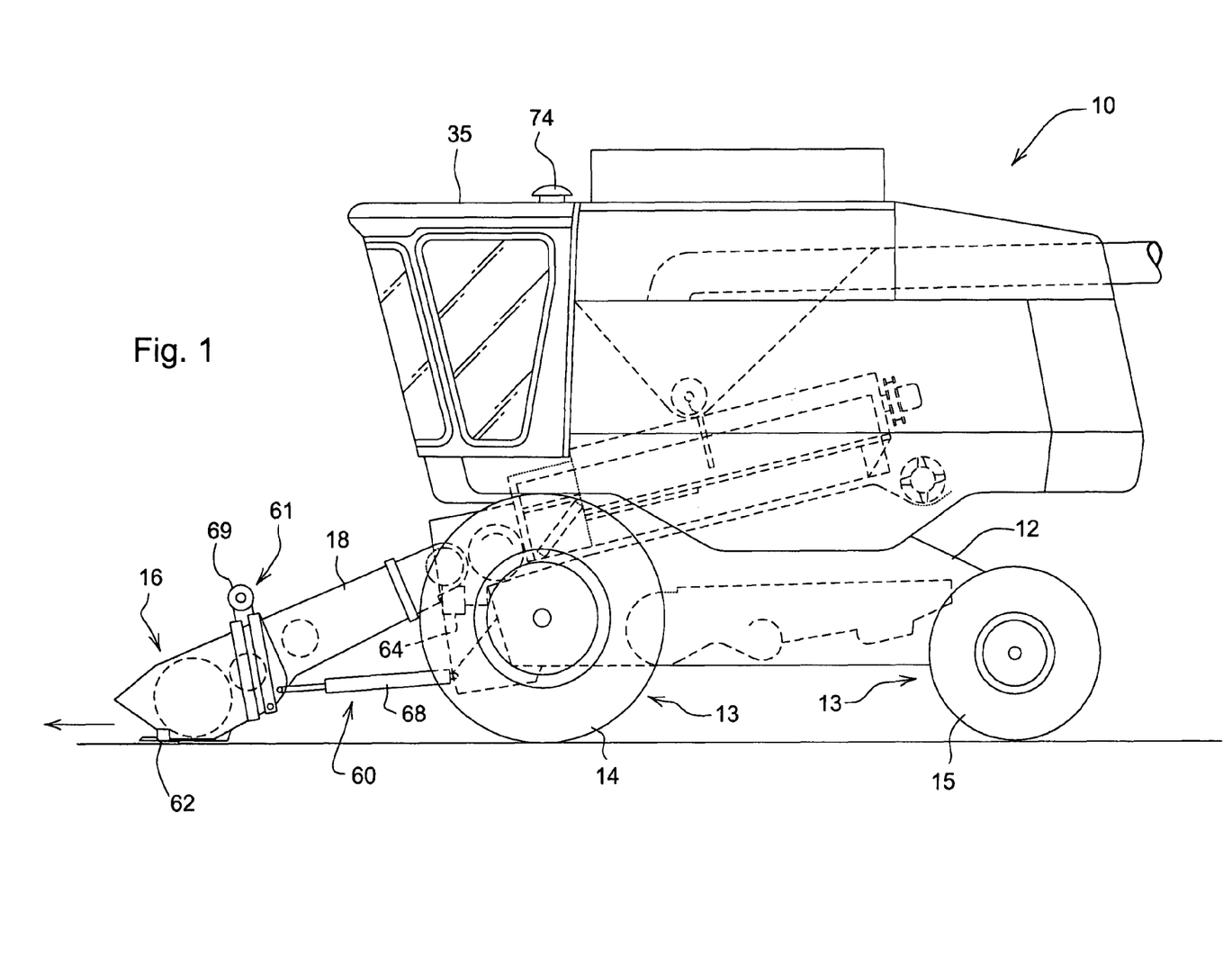
FIG. 1 is a side view of a vehicle with an implement position control system.

Referring now to FIG. 1, therein is shown an agricultural vehicle in the form of a harvester or combine 10 comprising a main frame 12 having wheel structure 13 including front and rear ground engaging wheels 14 and 15 supporting the main frame 12 for forward movement over a field of crop to be harvested. Although wheels 14 and 15 are shown, the wheel structure 13 could include or be composed of ground engaging tracks. In the following, references to directions (like forward) are cited with respect to the forward direction of combine 10 that is directed to the left in FIG. 1 as shown by the arrow.

An implement in the form of a header or harvesting platform 16 is used for harvesting a crop and directing it to a feederhouse 18. The feederhouse 18 is pivotally connected to the frame 12 around a horizontal axis extending transversely to the forward direction such that the platform 16 is vertically adjustable. The feederhouse 18 includes a conveyor (not shown) for conveying the harvested crop to threshing and separating mechanisms(not shown) in the harvester or combine 10. The operation of the combine 10 is controlled from an operator's cab 35. Although the harvester 10 is shown as a combine 10 for harvesting grain, it is to be understood that the present invention may also be utilized with other types of harvesters having vertically controlled headers.

The height of the header 16 is controlled by a hydraulic lift system indicated generally at 60, and a header tilt system indicated generally at 61 may also be provided to maintain the header generally parallel to the surface of the ground. Feelers 62 or other conventional height sensing devices such as acoustic sensors supported from transversely spaced locations on the header 16 provide an indication of header height. A feederhouse transducer 64 provides an indication of the angle of the feederhouse 18 relative to the frame 12.

Figure 2:
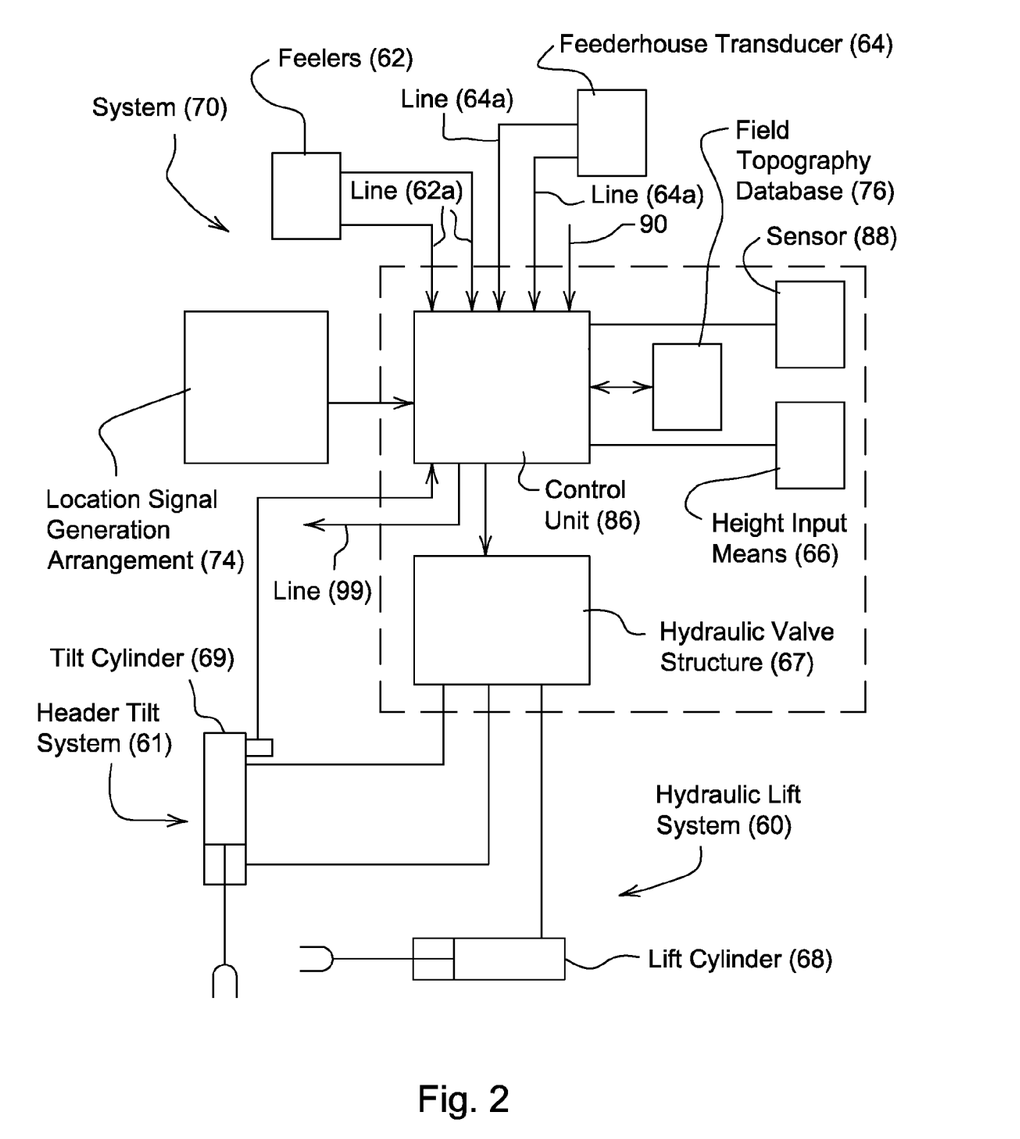
FIG. 2 is a schematic representation of an implement position control system utilized with the vehicle of FIG; 1.

As shown in FIG. 2, the signals from the devices 62 and 64 are connected via lines 62*a* and 64*a* to a control unit 86, which is connected to an electro hydraulic valve structure 67 to control hydraulic fluid flow to and from one or two lift cylinders 68 connected between the feederhouse 18 and the frame 12 to operate the lift system 60 to maintain the header 16 within a desirable operating height range. The valve structure 67 also controls extension and retraction of a tilt cylinder 69 to rotate the header 16 about a fore-and-aft extending axis for operation parallel to the ground surface.

When the signal from one or more sensors 62 on one side of the axis provides a raise indication while the signal from the opposite side provides a lower indication, the control unit 86 will operate the cylinder 69 to tilt the header about the axis for the proper attitude correction. When sensors on both sides of the axis provide a raise or a lower indication, the cylinder 68 will be extended or retracted accordingly for the necessary height correction to maintain the header in a pre-selected range of operating heights. A nominal or desired height of the header 16 above the ground can be input by the operator via a height input means 66 provided in the cab 35. The height input means 66 can be one of a variety of means, such as a potentiometer, a rotary encoder, a keyboard, a multi-positional switch, a touch-screen, a microphone with voice recognition software, or other method. The reaction times of the lift system 60 and the tilt system 61, however, are often too slow to compensate for abrupt changes in the ground surface contour, particularly when the harvester 10 is operating at relatively high speeds. The reaction time may also be too slow to compensate for sudden header position changes relative to the ground that result from one or more of the wheels 14 and 15 of the wheel structure 13 encountering a depression or raised area in the ground contour. The ability to cut a crop a pre-selected distance below the crop heads to limit throughput is also limited.

An improved header height and tilt control system includes a ground or crop contour predictive system indicated generally at 70 in FIG. 2. The system 70 is mounted on the combine 10 to provide ground contour information. The system 70 includes a location signal generation arrangement 74 located at a central location on the cab 35 for receiving signals from satellites of the GPS or another suitable positioning system like Glonass or Galileo. The location signal generation arrangement 74 is connected to the control unit 86, such that the latter obtains information about the actual position of the combine 10 within a field.

Control unit 86 is further connected to a field topography database 76 that contains three-dimensional data of the topography of the field to be harvested, for example data representing longitude, latitude and elevation of the field surface above sea level. The field can be divided into a grid consisting of rectangular elements with edge lengths (of e.g. 0.5 m) and the three-dimensional topography data can be stored for each of the elements of the field. The three-dimensional data can be recorded during a first harvesting path over the field with the combine 10, or measured with any other vehicle having a positioning system antenna, or taken from a topographical map.

Figure 3:
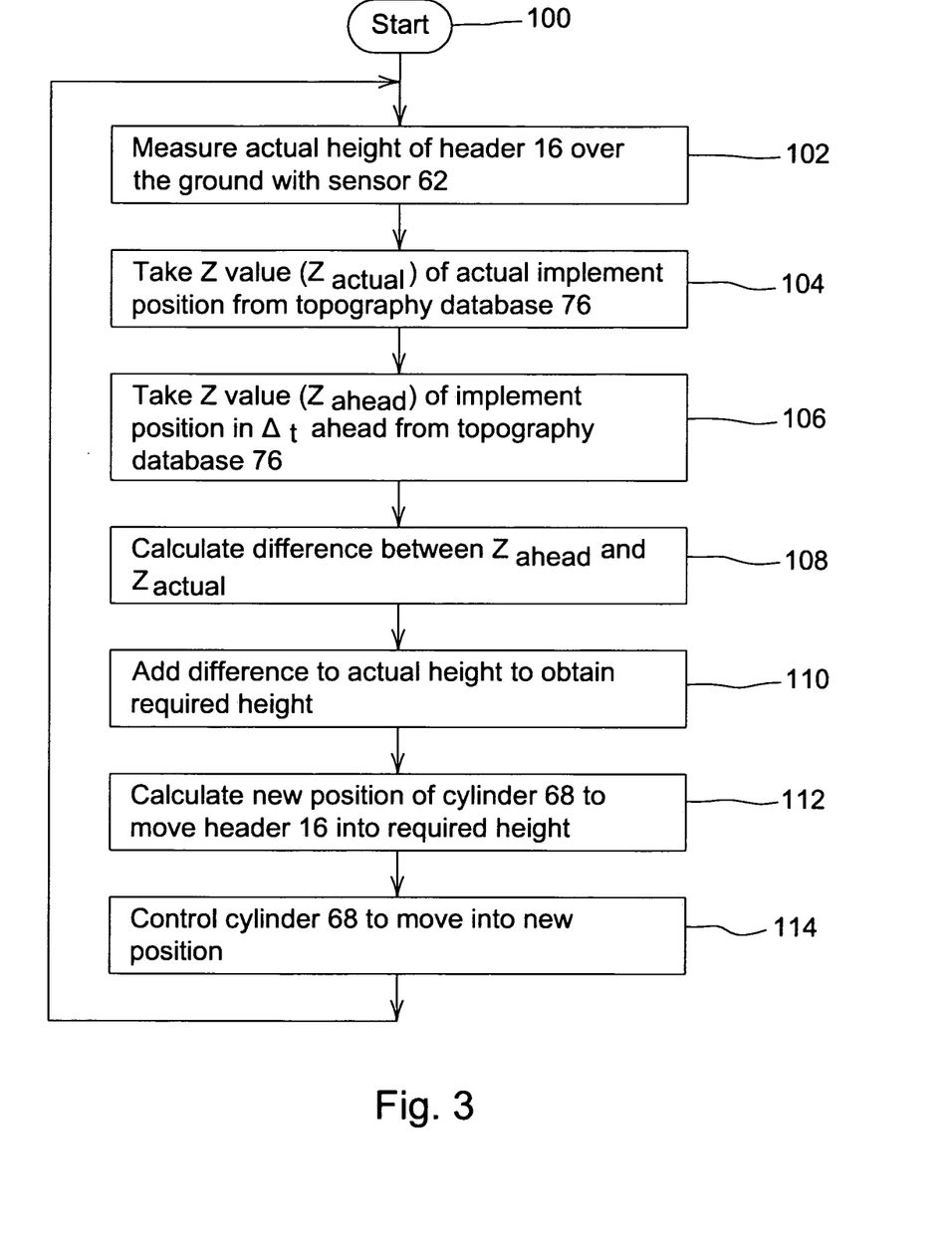
FIG. 3 is a flow diagram according to which the control unit adjusts the implement height.

During operation, the control unit 86 of system 70 proceeds according to the flow diagram of FIG. 3 to control cylinder 68 and thus the height of the platform 16. After start in step 100, in step 102 the actual height of platform 16 over the ground is measured with sensors 62. Due to the automatic lateral inclination control (see FIG. 4), usually both sensors 62 give similar values. If not, the lower one of either sensor values is taken, or an average of both.

In the next step 104, the control unit 86 calculates the elevation of the ground below the platform 16 using the topography database 76. In this step, the position of the signal generation arrangement 74 is converted into the platform position, by using data concerning the actual forward direction of the combine 10 that can be obtained by subtracting two subsequent position data from the location signal generation arrangement 74 and/or by using difference data from two antennae receiving position signals from satellites and/or by using a signal from a compass and/or an inertia navigation system and/or by using a signal from a steering system of the combine 10.

In step 106, the elevation of the ground below the platform 16 in a predetermined area ahead of the platform 16 is calculated, assuming that combine 10 has been driving further in the actual steering direction for an amount of time Δt, that may be 1s. The distance between the predefined area and the combine 10 (and hence Δt) preferably depends upon the propelling speed of the combine 10; hence speed information can input to the control unit via a line 90 or derived from the data provided by the location signal generation arrangement 74 by subtracting two subsequent position data. In this step, information about the heading of the combine 10 in the horizontal plane is required, that can be derived as described in the preceding paragraph.

Then, in step 108 a difference between the elevation of the ground ahead the platform 16 and the elevation of the ground beneath the platform 16 is calculated. Possible errors in the absolute elevation values in the database 76 are not critical, since they cancel during calculation of the difference. Afterwards, in step 110 a required change of the platform height is calculated based upon this difference, the actual platform height from step 102, and the desired height input via height input means 66, and this difference is used to calculate a required new position of cylinder 68 in step 112.

It should be noted that in step 110 the forward inclination of the ground below the wheels 14, 15 of the combine 10 might be considered, since it can influence the height of the platform 16 when the combine 10 moves ahead, when the ground below the wheels 14, 15 is not horizontal in the forward direction.

Control unit 86 then controls valve structure 67 in step 114 to move the lift cylinders 68, such that the signals from the feelers 62 on line 62*a* corresponds to the desired header height when the header 16 has reached the predefined area.

The control system 70 can thus lift the header 16 sufficiently early before it incidents upon a steep ground incline. Analogously, the header can be sufficiently early lowered when the combine 10 drives down a hill.

The system 70 can also be utilized to complement the operation of the tilt system 61 to predict necessary header angle changes to avoid situations wherein the header 16 is substantially offset from a parallel relationship with the ground. If the one side of the ground surface is rising relative to the opposite side for an area, advance information of the particular tilt necessary for that area can be provided for a timely tilt system response even at relatively high ground speeds. This is described in more detail based upon FIG. 4. After start in step 120, in step 122 the actual height of platform 16 over the ground is measured with sensors 62 and the actual lateral inclination of the platform 16 is calculated.

Figure 4:
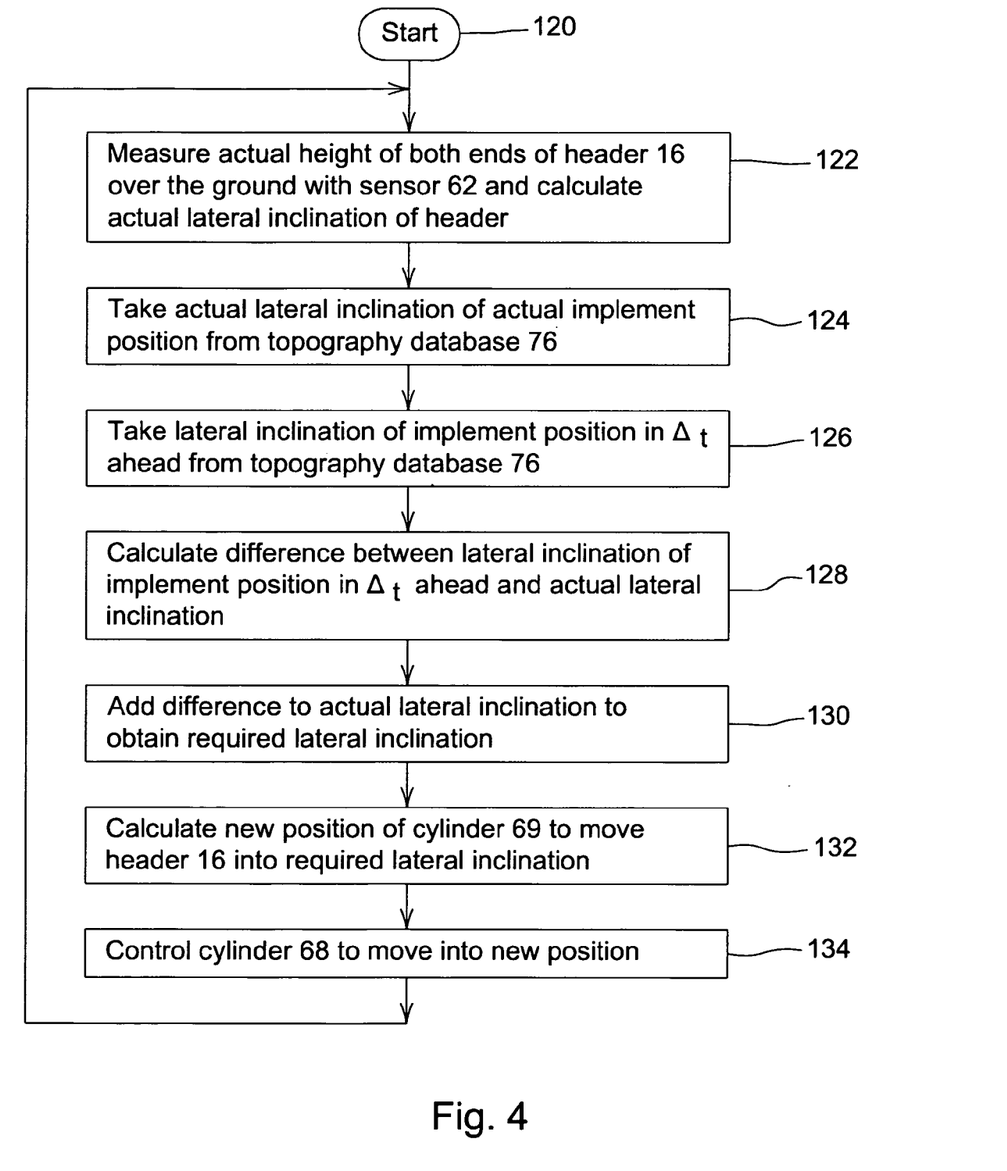
FIG. 4 is a flow diagram according to which the control unit adjusts the lateral inclination of the implement.

In the next step 124, the control unit 86 calculates the lateral inclination of the ground below the platform 16 using the topography database 76. In this step, the position of the signal generation arrangement 74 is converted into the platform position, as described previously. In step 126, the lateral inclination of the ground below the platform 16 in a predetermined area ahead of the platform 16 is calculated, assuming that combine 10 has been driving further in the actual steering direction for an amount of time Δt, that may be 1s. The distance between the predefined area and the combine 10 (and hence Δt) preferably depends upon the propelling speed of the combine 10; hence speed information can input to the control unit via a line 90 or derived from the data provided by the location signal generation arrangement 74 by subtracting two subsequent position data. In this step, information about the heading of the combine 10 in the horizontal plane is required, that can be derived as described above.

Then, in step 128 a difference between the lateral inclination of the ground ahead the platform 16 and the lateral inclination of the ground beneath the platform 16 is calculated. Possible errors in the absolute elevation values in the database 76 are not critical, since they cancel during calculation of the inclinations. Afterwards, in step 130 a required change of the lateral platform inclination is calculated based upon this difference and the actual lateral platform inclination from step 102, and this change is used to calculate a required new position of cylinder 69 in step 132.

It should be noted that in step 120 also the forward inclination of the ground below the wheels 14, 15 of the combine 10 might be considered, since it can influence the lateral inclination of the platform 16 when the combine 10 moves ahead, when the ground beneath wheels 14, 15 is not horizontal in the lateral direction.

Control unit 86 then controls valve structure 67 in step 134 to move the tilt cylinder 69. Thus, the lateral inclination of platform 16 is automatically controlled in a predictive manner combining values from sensors 62 and from the field topography database 76.

The location signal generation arrangement 74 provides elevation data that can be used for calculating elevation data of the ground using the signals from the feelers 62 or the feederhouse transducer 64 and known vertical and horizontal offsets. These elevation data could be used for improving the accuracy of database 76 and stored in a new topographical database with a high accuracy. Further, combine 10 can be provided with another sensor 88 for detecting the orientation of the vehicle, e.g. for a lateral inclination and/or an inclination in the forward direction. Such sensors are already incorporated into available location signal generation arrangements 74 for deadline reckoning purposes. The values from these sensors can be compared with corresponding nominal values derived from the field topography database 76, and be used to improve the accuracy of the new topographical database. They can also be used for improving accuracy of the actuator 68, 69 of the positioning system, since actual orientation or inclination values of the ground can be derived from those sensors instead of taking those from the field topography database 76.

The control unit 86 can also provide a guidance control signal on line 99 to a steering cylinder controlling the steerable rear wheels 15 of the combine. The guidance control signal depends on the position information from the location signal generation arrangement 74 and a pre-planned path stored in a memory (not shown) connected to control unit 86.

Instead of being mounted on the cab 35, the location signal generation arrangement 74 could also be directly mounted to the header 16, to avoid a conversion of the position of arrangement 74 to the position of the platform 16.

Having described the preferred embodiment, it will become apparent that various modifications can be made without departing from the scope of the invention as defined in the accompanying claims.

The following is claimed:

1. A system for controlling the position of an agricultural implement coupled to an agricultural vehicle, the implement being movable with respect to the vehicle by an electro-hydraulic valve structure configured to move the implement in response to position control signals, the system comprising:
   a field topography database containing three-dimensional data of the topography of a field;
   a location signal generation arrangement for providing location data of the position of at least one of the vehicle and the implement in the field;
   an implement position sensor arranged to sense the implement position of the implement with respect to the ground, the implement position comprising the height of the implement with respect to the ground; and
   a control unit connected to the field topography database, the location signal generation arrangement, the implement position sensor and the electro-hydraulic valve structure, the control unit operable to provide position control signals to the electro-hydraulic valve structure based upon actual implement position data received from the implement position sensor and expected required position change data, where the expected required position change data is based on a difference between an elevation of the ground below the implement and another elevation of the ground in a predetermined area ahead of the implement, the predetermined area calculated consistent with further movement in a steering direction or heading of the vehicle, a distance between the vehicle and the predefined area determined depending upon vehicle speed; where the expected required position change data are derived from elevation data recalled from the field topography database based upon the location data and heading data of the vehicle to automatically move the implement into a predefined position within a pre-selected range of operating heights with respect to the surface of ground.

2. The system according to claim 1, wherein the control unit is operable to derive the expected required position change data from the field topography database based upon heading data.

3. The system according to claim 2, wherein the heading data are derived by at least one of subtracting two subsequent position data from the location signal generation arrangement, using difference data from two spaced location signal generation arrangements mounted to the vehicle, using a signal from a compass, using a signal from an inertia navigation system, or by using a signal from a steering system of the vehicle.

4. The system according to claim 1, wherein the control unit is operable to provide the control signals by adding the actual implement position data received from the implement position sensor and the expected required position change data.

5. The system according to claim 1, wherein the electro-hydraulic valve structure is operable to alter one of height and angle of the implement with respect to the agricultural vehicle.

6. The system according to claim 5, wherein the control unit is operable to determine the difference between the elevation of the ground ahead the agricultural implement and the elevation of the ground below the agricultural implement based upon the location data and the data in the field topography database and to generate position control signals for the positioning altering arrangement for adjusting one of the height and angle of the implement to the determined difference in elevation.

7. The system according to claim 1, wherein the control unit is operable to provide position control signals to the position altering arrangement prior to the implement reaching the predetermined area, such that the desired position of the implement is achieved when the predefined area is reached.

8. The system according to claim 1, wherein the electro-hydraulic valve structure is operable to alter the lateral inclination of the implement with respect to the agricultural machine.

9. The system according to claim 8, wherein the control unit is operable to determine a difference between the lateral inclination of the ground in a predetermined area ahead of the agricultural implement and the lateral inclination of the ground below the agricultural implement based upon the location data and the data in the field topography database, and wherein the control unit is operable to generate position control signals for the positioning altering arrangement for adjusting the lateral inclination of the implement to the determined difference.

10. The system according to claim 1, wherein the control unit is operable to provide a new topographical database based upon signals from the implement position sensor.

11. The system according to claim 1, wherein the control unit is connected to a sensor for detecting the orientation of the vehicle and to compare signal values from the sensor with corresponding nominal values derived from the field topography database.

12. An agricultural vehicle with an agricultural implement coupled to the agricultural vehicle having a system for controlling the position of the implement, the implement being movable with respect to the vehicle by an electro-hydraulic valve structure configured to move the implement in response to position control signals, the system comprising:
   a field topography database containing three-dimensional data of the topography of a field;
   a location signal generation arrangement for providing location data of the position of at least one of the vehicle and the implement in the field;
   an implement position sensor arranged to sense the implement position of the implement with respect to the ground, the implement position comprising the height of the implement with respect to the ground; and
   a control unit connected to the field topography database, the location signal generation arrangement, the implement position sensor and the electro-hydraulic valve structure, the control unit operable to provide position control signals to the electro-hydraulic valve structure based upon actual implement position data received from the implement position sensor and expected required position change data, where the expected required position change data is based on a difference between an elevation of the ground below the implement and another elevation of the ground in a predetermined area ahead of the implement, the predetermined area calculated consistent with further movement in a steering direction or heading of the vehicle, a distance between the vehicle and the predefined area determined depending upon vehicle speed; where the expected required position change data are derived from elevation data recalled from the field topography database based upon the location data and heading data of the vehicle to automatically move the implement into a predefined position within a pre-selected range of operating heights with respect to the surface of ground.

13. The agricultural vehicle according to claim 12, wherein the agricultural vehicle is at least one of a self propelled harvesting machine with a header, a tractor with a ground engaging tool and a sprayer with a boom.

14. A method for controlling the position of an agricultural implement coupled to an agricultural vehicle, the implement being movable with respect to the vehicle by an electro-hydraulic valve structure configured to move the implement in response to position control signals, the method comprising:
   providing a field topography database containing three-dimensional data of the topography of a field;
   providing a location signal generation arrangement producing location data of the position of at least one of the vehicle and the implement in the field;
   providing an implement position sensor sensing the implement position of the implement with respect to the ground, the implement position comprising the height of the implement with respect to the ground;
   providing a control unit connected to the field topography database, the location signal generation arrangement, the implement position sensor and the electro-hydraulic valve structure; and
   operating the control unit to provide position control signals to the electro-hydraulic valve structure based upon actual implement position data received from the implement position sensor and expected required position change data, where the expected required position change data is based on a difference between an elevation of the ground below the implement and another elevation of the ground in a predetermined area ahead of the implement, the predetermined area calculated consistent with further movement in a steering direction or heading of the vehicle, a distance between the vehicle and the predefined area determined depending upon vehicle speed; where the expected required position change data are derived from elevation data recalled from the field topography database based upon the location data and heading data of the vehicle to automatically move the implement into a predefined position within a pre-selected range of operating heights with respect to the surface of ground.

* * * * *